United States Patent
Kuwano et al.

(10) Patent No.: US 7,569,959 B2
(45) Date of Patent: Aug. 4, 2009

(54) MOTOR

(75) Inventors: Masayuki Kuwano, Kosai (JP); Shinji Santo, Kosai (JP); Keiichi Uemura, Kariya (JP); Toshio Yamamoto, Kosai (JP)

(73) Assignee: ASMO Co., Ltd. (JP)

( * ) Notice: Subject to any disclaimer, the term of this patent is extended or adjusted under 35 U.S.C. 154(b) by 298 days.

(21) Appl. No.: 11/574,370

(22) PCT Filed: Aug. 31, 2005

(86) PCT No.: PCT/JP2005/015900

§ 371 (c)(1),
(2), (4) Date: Feb. 27, 2007

(87) PCT Pub. No.: WO2006/025444

PCT Pub. Date: Mar. 9, 2006

(65) Prior Publication Data

US 2007/0205685 A1 Sep. 6, 2007

(30) Foreign Application Priority Data

Aug. 31, 2004 (JP) ............................ 2004-252735

(51) Int. Cl.
*H02K 13/00* (2006.01)

(52) U.S. Cl. .................. 310/148; 310/237; 310/233; 310/239

(58) Field of Classification Search .............. 310/143, 310/148, 232–233, 237–239, 68 E, 71
See application file for complete search history.

(56) References Cited

U.S. PATENT DOCUMENTS

| 3,566,165 | A | * | 2/1971 | Lohr | 310/67 R |
| 5,712,522 | A | * | 1/1998 | Niimi | 310/248 |
| 5,744,889 | A | * | 4/1998 | Niimi | 310/239 |
| 5,821,662 | A | * | 10/1998 | Kajino et al. | 310/239 |
| 5,895,995 | A | * | 4/1999 | Soh | 310/239 |
| 6,011,316 | A | * | 1/2000 | Niimi | 290/38 R |

(Continued)

FOREIGN PATENT DOCUMENTS

JP    56-48281    4/1981

(Continued)

OTHER PUBLICATIONS

International Search Report published with WO 2006/025444 A1 on Mar. 9, 2006, for "Motor"; PCT/JP2005/015900.

*Primary Examiner*—Thanh Lam
(74) *Attorney, Agent, or Firm*—Carstens & Cahoon LLP

(57) ABSTRACT

A motor has a field body having a number of field poles and an armature body having a number of coils which is placed outside of the above described field body in the radial direction. A commutator secured to the armature body has a number of segments to which the coils are respectively connected. The motor has a power supplying part for supplying a current to the coils and a brush holder which is secured to the field body. The brush holder contains an anode side brush device which makes contact with and slides against the commutator and the power supplying part and a cathode side brush device which makes contact with and slides against the commutator and the power supplying part. Accordingly, the efficiency of use of the coils can be increased.

12 Claims, 11 Drawing Sheets

U.S. PATENT DOCUMENTS

| | | |
|---|---|---|
| 6,488,259 B1 | 12/2002 | Fujita et al. |
| 6,756,717 B2 * | 6/2004 | Yamamoto et al. .......... 310/225 |
| 2002/0043302 A1 | 4/2002 | Ono et al. |

FOREIGN PATENT DOCUMENTS

| | | |
|---|---|---|
| JP | 08-289520 | 11/1996 |
| JP | 2000-230657 | 8/2000 |
| JP | 2001-286104 | 10/2001 |
| JP | 2001-346345 | 12/2001 |
| JP | 2002-057015 | 2/2002 |
| JP | 2004-088915 | 3/2004 |
| JP | 2005-117822 A | 4/2005 |

* cited by examiner

Fig. 8

| Number of Field Poles 2p | | 3 Coils | 4 Coils | 5 Coils | 6 Coils | 7 Coils | 8 Coils | 9 Coils | 10 Coils | 11 Coils | 12 Coils | 13 Coils | 14 Coils | 15 Coils |
|---|---|---|---|---|---|---|---|---|---|---|---|---|---|---|
| 2 Poles | Short Pitch Factor K | 0.866 | 0.707 | 0.588 | 0.500 | 0.434 | 0.383 | 0.342 | 0.309 | 0.282 | 0.259 | 0.239 | 0.223 | 0.208 |
| | Number of Parallel Circuits | 1 | 1 | 1 | 1 | 1 | 1 | 1 | 1 | 1 | 1 | 1 | 1 | 1 |
| | Commutated Voltage (V) | 8.0 | 6.0 | 4.8 | 4.0 | 3.4 | 3.0 | 2.7 | 2.4 | 2.2 | 2.0 | 1.8 | 1.7 | 1.6 |
| | Number of Segments | 3 | 4 | 5 | 6 | 7 | 8 | 9 | 10 | 11 | 12 | 13 | 14 | 15 |
| 4 Poles | Short Pitch Factor K | 0.866 | 1.000 | 0.951 | 0.866 | 0.782 | 0.707 | 0.643 | 0.588 | 0.541 | 0.500 | 0.465 | 0.434 | 0.407 |
| | Number of Parallel Circuits | 1 | 1 | 1 | 2 | 2 | 2 | 2 | 2 | 2 | 2 | 2 | 2 | 2 |
| | Commutated Voltage (V) | 8.0 | 6.0 | 4.8 | 8.0 | 6.9 | 6.0 | 5.3 | 4.8 | 4.4 | 4.0 | 3.7 | 3.4 | 3.2 |
| | Number of Segments | 6 | 8 | 10 | 12 | 14 | 16 | 18 | 20 | 22 | 24 | 26 | 28 | 30 |
| 6 Poles | Short Pitch Factor K | 0.000 | 0.707 | 0.951 | 1.000 | 0.975 | 0.924 | 0.866 | 0.809 | 0.756 | 0.707 | 0.663 | 0.623 | 0.588 |
| | Number of Parallel Circuits | 1 | 1 | 1 | 1 | 1 | 1 | 3 | 1 | 1 | 1 | 1 | 1 | 1 |
| | Commutated Voltage (V) | 8.0 | 6.0 | 4.8 | 4.0 | 3.4 | 3.0 | 8.0 | 2.4 | 2.2 | 2.0 | 1.8 | 1.7 | 1.6 |
| | Number of Segments | 9 | 12 | 15 | 18 | 21 | 24 | 27 | 30 | 33 | 36 | 39 | 42 | 45 |
| 8 Poles | Short Pitch Factor K | -0.866 | 0.000 | 0.588 | 0.866 | 0.975 | 1.000 | 0.985 | 0.951 | 0.910 | 0.866 | 0.823 | 0.782 | 0.743 |
| | Number of Parallel Circuits | 1 | 1 | 1 | 2 | 1 | 1 | 1 | 2 | 1 | 4 | 1 | 1 | 1 |
| | Commutated Voltage (V) | 8.0 | 6.0 | 4.8 | 8.0 | 3.4 | 3.0 | 2.7 | 4.8 | 2.2 | 8.0 | 1.8 | 1.7 | 1.6 |
| | Number of Segments | 12 | 16 | 20 | 24 | 28 | 32 | 36 | 40 | 44 | 48 | 52 | 56 | 60 |
| 10 Poles | Short Pitch Factor K | -0.866 | -0.707 | 0.000 | 0.500 | 0.782 | 0.924 | 0.985 | 1.000 | 0.990 | 0.966 | 0.935 | 0.901 | 0.866 |
| | Number of Parallel Circuits | 1 | 1 | 1 | 1 | 1 | 1 | 1 | 1 | 1 | 1 | 1 | 1 | 5 |
| | Commutated Voltage (V) | 8.0 | 6.0 | 4.8 | 4.0 | 3.4 | 3.0 | 2.7 | 2.4 | 2.2 | 2.0 | 1.8 | 1.7 | 8.0 |
| | Number of Segments | 15 | 20 | 25 | 30 | 35 | 40 | 45 | 50 | 55 | 60 | 65 | 70 | 75 |

Number of Coils Q

MOTOR

FIELD OF THE INVENTION

The present invention relates to a motor in which an armature having a coil is placed outside the field pole in a radial direction.

BACKGROUND OF THE INVENTION

General direct current motors have a rotor which is an armature having a number of coils, and a stator which is placed outside this rotor in the radial direction. The stator has a number of field poles. A commutator having a number of segments is attached and integrated with the rotary shaft of the rotor in such a manner as to be rotatable. The stator has a brush which makes contact with and slides against the above described commutator so that electricity is supplied. When the motor is driven, electricity is supplied to the number of coils of the rotor in sequence via the brush and the commutator.

In addition, there are motors in which an armature having a number of coils functions as a stator instead of a rotor, and this armature stator is placed outside the rotor in the radial direction. This type of motor generally has a control circuit for switching the supply of a current to the number of coils in sequence. In contrast, Patent Document 1 discloses a motor in which the supply of a current is switched without using a control circuit.

The direct current motor disclosed in the above described document has an armature stator having nine coils and a rotor having a number of field poles which is placed inside the armature stator in the radial direction. A rotational disc is secured to the rotary shaft of the rotor. The rotational disc has a commutator which is placed in the vicinity of the center and three slip rings in concentric circles, large, medium and small, surrounding the commutator. The commutator is made of a number of commutator pieces aligned in the circumferential direction, and each commutator piece is connected to one of the three slip rings. One of the three slip rings functions as an anode slip ring, and another functions as a cathode slip ring.

The above described armature stator has a pair of first brushes which make contact with and slide against the above described commutator, and a total of three second brushes which respectively make contact with and slide against the above described slip rings. One of the pair of first brushes functions as an anode brush, and the other functions as a cathode brush. One of the three second brushes functions as an anode brush, and another functions as a cathode brush. Out of the nine coils, every three continuing in the circumferential direction are connected in series. That is to say, the nine coils are divided into three groups.

In the direct current motor in the above described document, a current flows through an electrical path starting from an external power supply, passing through a first anode brush of the armature stator, an anode slip ring of the rotor, a second anode brush of the armature stator, a coil, a second cathode brush, a cathode slip ring of the rotor and a first anode brush of the armature stator, and reaching the external power supply.

The rotor rotates due to the interactions between the rotational magnetic fields generated by the coils to which a current is supplied, and the magnetic field generated by the field poles of the rotor. The rotational disc rotates together with the rotor, and at the same time, the commutator piece making contact with and sliding against a first brush secured to the armature stator is switched in sequence, so that the three serial, connected coils through which a current flows are also switched in turn.

The motor in the above described document has such a configuration that currents having the same phase are supplied to three coils which continue in the circumferential direction in a group from among the nine coils, and when the motor is driven, currents having different phases are simultaneously supplied to two groups, so that rotational magnetic fields are generated. In a direct current motor having such coils, the field poles of the rotor are generally set so that the angular interval between respective N poles and S poles is 180°. That is to say, it can be said that the direct current motor of the above described document is driven in accordance with the same principle as motors having two field poles and three coils.

In the direct current motor in the above described document, two slip rings which are used to supply a current to the armature stator are selected from three slip rings, and therefore, no current is supplied to the three coils which are connected to the unselected slip ring. That is to say, when the direct current motor is driven, a current flows through six out of the nine coils, and at all times, there are three coils to which no current is supplied, and therefore, the efficiency of use of the coils is low. When the efficiency of use of the coils is low, the output of the direct current motor also becomes low.

Patent Document 1: Japanese Laid-Open Patent Publication No. 2000-230657

SUMMARY OF THE INVENTION

An objective of the present invention is to provide a motor that improves the efficiency of use of coils.

In order to achieve the above described objective, the present invention provides a motor having a field body having a plurality of field poles, and an armature body having a plurality of coils which is placed outside of the above described field body in a radial direction. The motor has a commutator which is secured to the armature body and a power supplying part for supplying a current to the coils. The commutator has a plurality of segments to which the coils are respectively connected. A brush holder contains an anode side brush device which makes contact with and slides against the commutator and the power supplying part, and a cathode side brush device which makes contact with and slides against the commutator and the power supplying part. The brush holder is secured to the field body.

In addition, the present invention provides a motor having a rotor having a plurality of field poles, and an armature stator having a plurality of coils which is placed outside the above described rotor in a radial direction. The motor has a commutator having a plurality of segments to which the coils are respectively connected, and a power supply part for supplying a current to the above described coils. A brush holder contains an anode side brush device which makes contact with and slides against the above described commutator and the above described power supplying part, and a cathode side brush device which makes contact with and slides against the commutator and the above described power supplying part. The brush holder rotates together with the above described rotor.

In addition, the present invention provides a motor having a rotor having field poles, the number of which is represented by 2P (P is a natural number), and an armature stator having coils, the number of which is represented by Q (Q is a natural number). The coils are placed outside the rotor in the radial direction. The motor has a commutator having segments, the number of which is represented P×Q. The coils are respectively connected to the segments, and a power supplying part for supplying a current to the above described coils. A brush holder contains an anode side brush device which makes contact with and slides against the above described commutator and the power supplying part, and a cathode side brush device which makes contact with and slides against the commutator and the power supplying part. The brush holder rotates together with the above described rotor.

In addition, the present invention provides a direct current motor having a magnet rotor which is placed inside in the radial direction and an armature stator which is placed outside in the radial direction. This motor has a commutator which is secured to the above described armature stator, a power supplying brush which rotates together with the above described rotor and a brush holder which contains the above described power supplying brush and rotates together with the above described rotor.

BRIEF DESCRIPTION OF THE DRAWINGS

FIG. 8 is a table showing the relationship between the number of field poles and the number of coils;

DETAILED DESCRIPTION OF THE PREFERRED EMBODIMENTS

In the following, a first embodiment of the present invention will be described in reference to the drawings.

Figure 1:
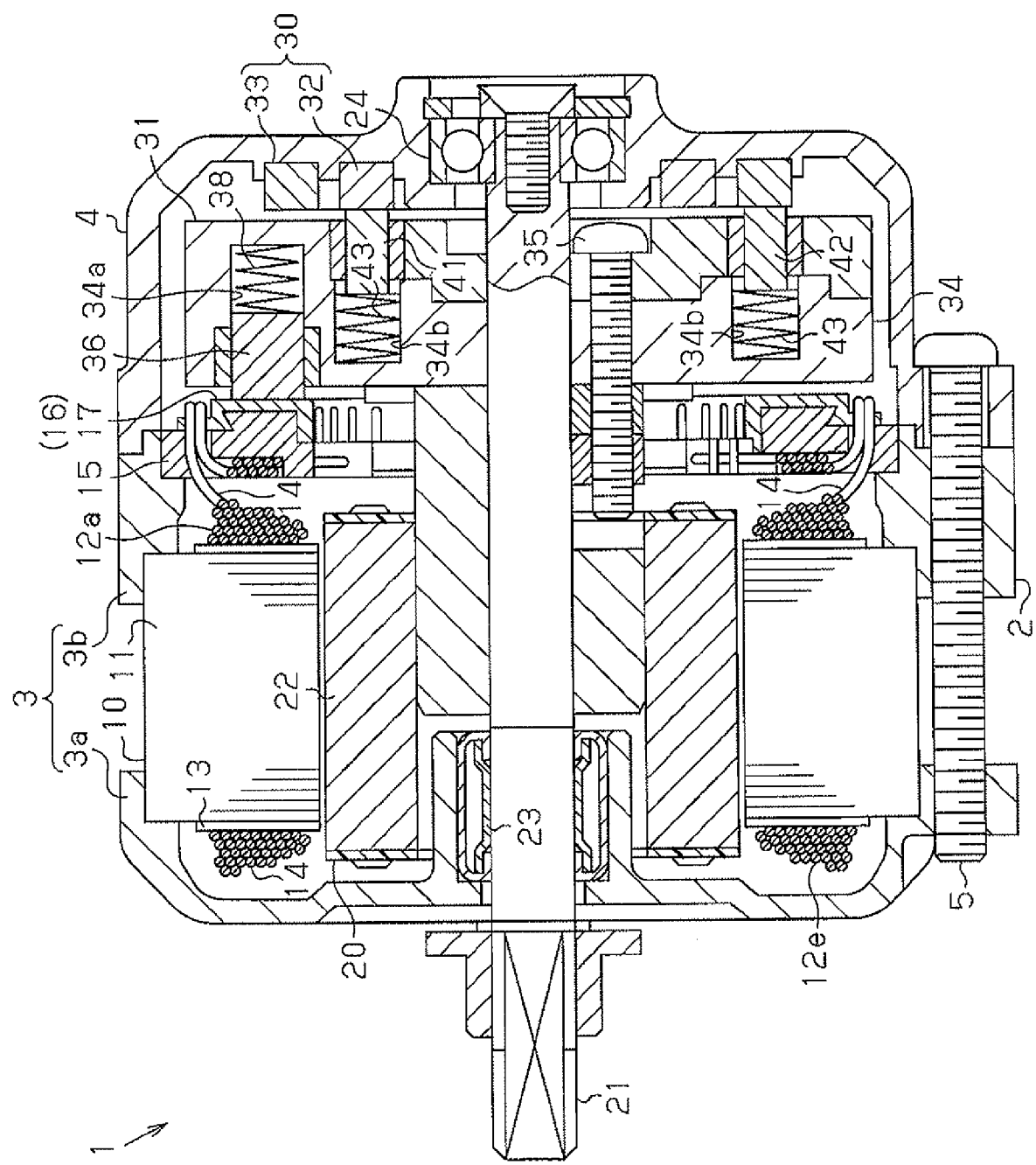
FIG. 1 is a cross-sectional view showing a motor according to a first embodiment of the present invention along the axial direction.

As shown in FIG. 1, a motor 1 according to the present embodiment is an inner rotor type direct current motor. The motor 1 is provided with a housing 2, a rotor 20, which is a field body contained in the housing 2, and an armature stator 10, which is an armature body placed outside the rotor 20 in the radial direction. A commutator 17 and a power supplying part 30 are attached to the housing 2. The rotor 20 is provided with a brush device 31.

The housing 2 is formed of an armature housing 3 made of a cylindrical first housing member 3a of which one end is closed and a cylindrical second housing member 3b, and a cylindrical brush device housing 4 of which one end is closed. The brush device housing 4 is secured to the armature housing 3 with a screw 5. The edge of the opening of the first housing member 3a and the edge of the first opening of the second housing member 3b which faces this first housing member 3a sandwich and secure the above described substantially cylindrical armature stator 10.

Figure 2:
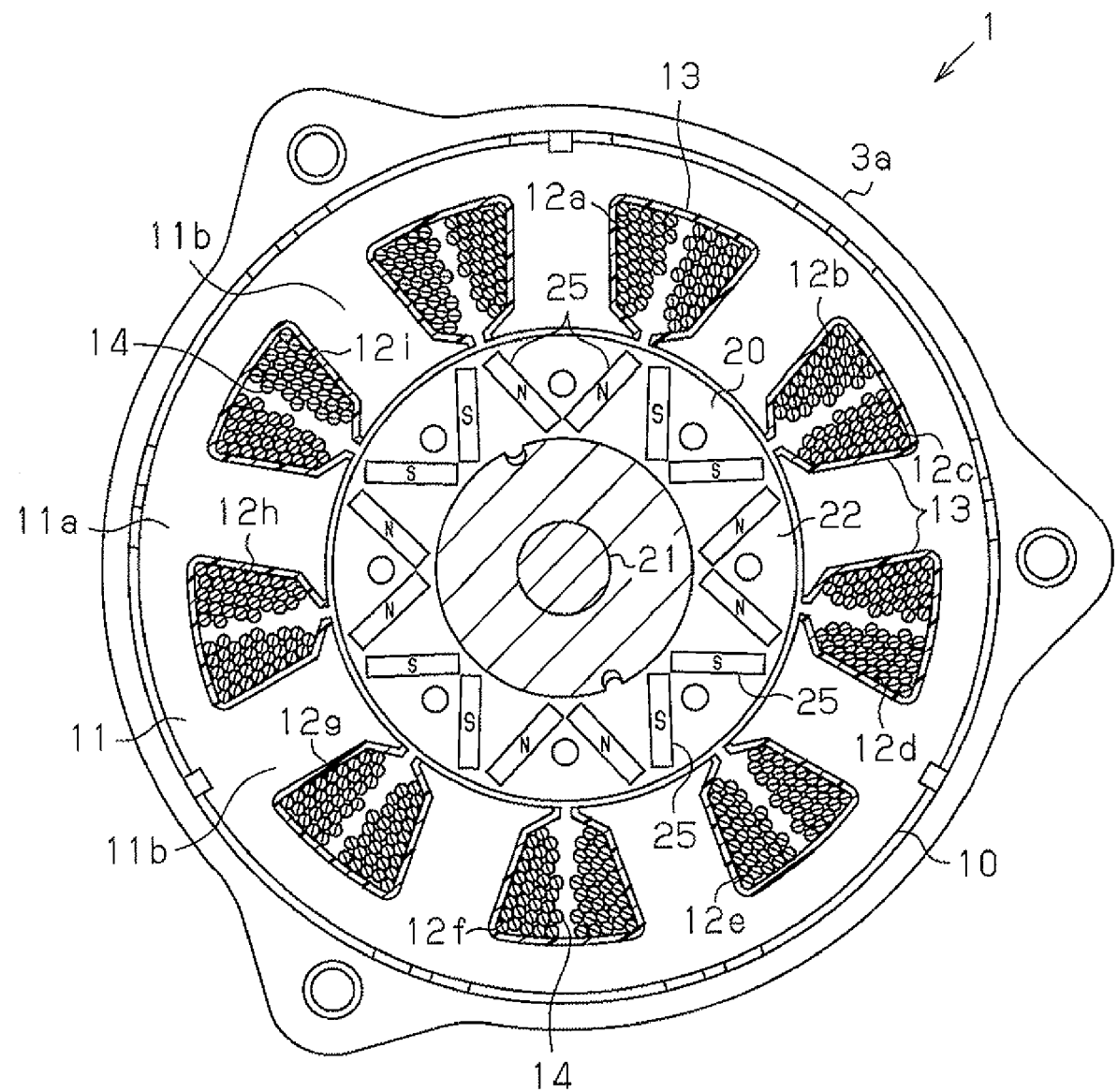
FIG. 2 is a cross-sectional view showing the motor of FIG. 1 taken along a direction perpendicular to the axial direction.

As shown in FIG. 2, the armature stator 10 is provided with stator core 11 and first to ninth coils 12a to 12i. The stator core 11 is provided with a cylindrical portion 11a and a number (nine in the present embodiment) of teeth 11b which extend from the inner peripheral surface of the cylindrical portion 11a toward the inside in the radial direction. The teeth 11b are arranged at equal angular intervals in the circumferential direction. Wires 14 are wound around these teeth 11b via insulating collars 13 in the form of concentrated winding and a short pitch winding manner, and thus, the first to ninth coils 12a to 12i are formed. In the present embodiment, there are nine teeth 11b, and therefore, the number of coils Q is nine.

As shown in FIG. 1, an annular commutator bracket 15 is secured to the edge of the second opening of the above described second housing member 3b on the side opposite to the armature stator 10. In other words, the commutator bracket 15 is secured to the armature stator 10 via the second housing member 3b. The commutator 17 is secured to the surface of the commutator bracket 15 on the side opposite to the armature stator 10.

Figure 3:
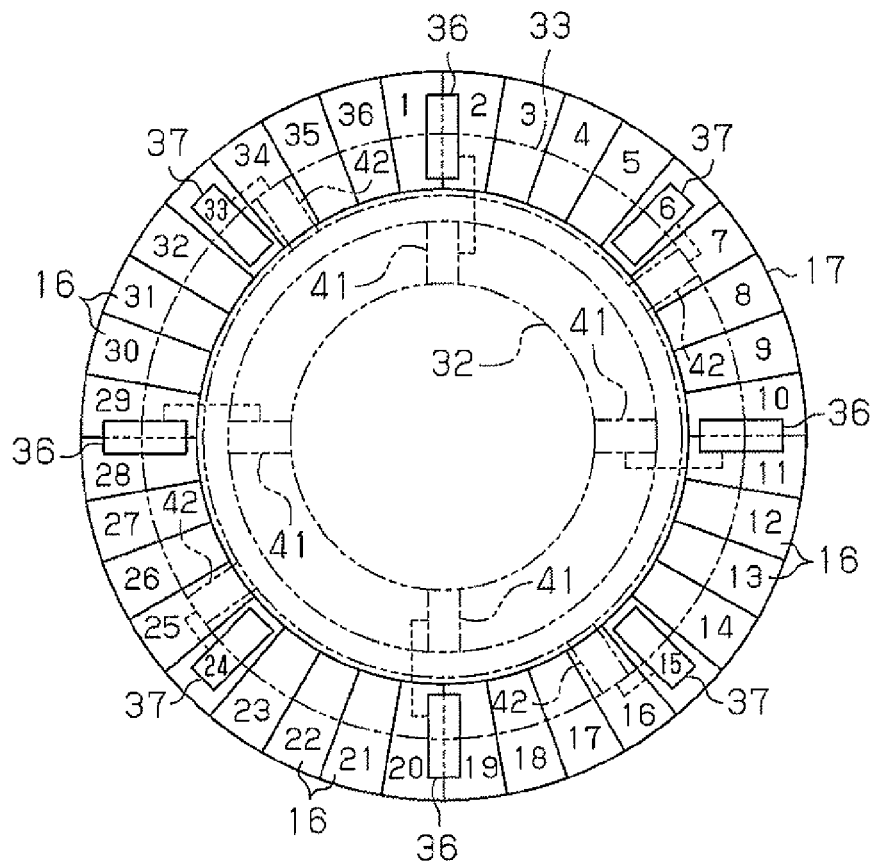
FIG. 3 is a plan view showing the commutator shown in FIG. 1.
Figure 5:
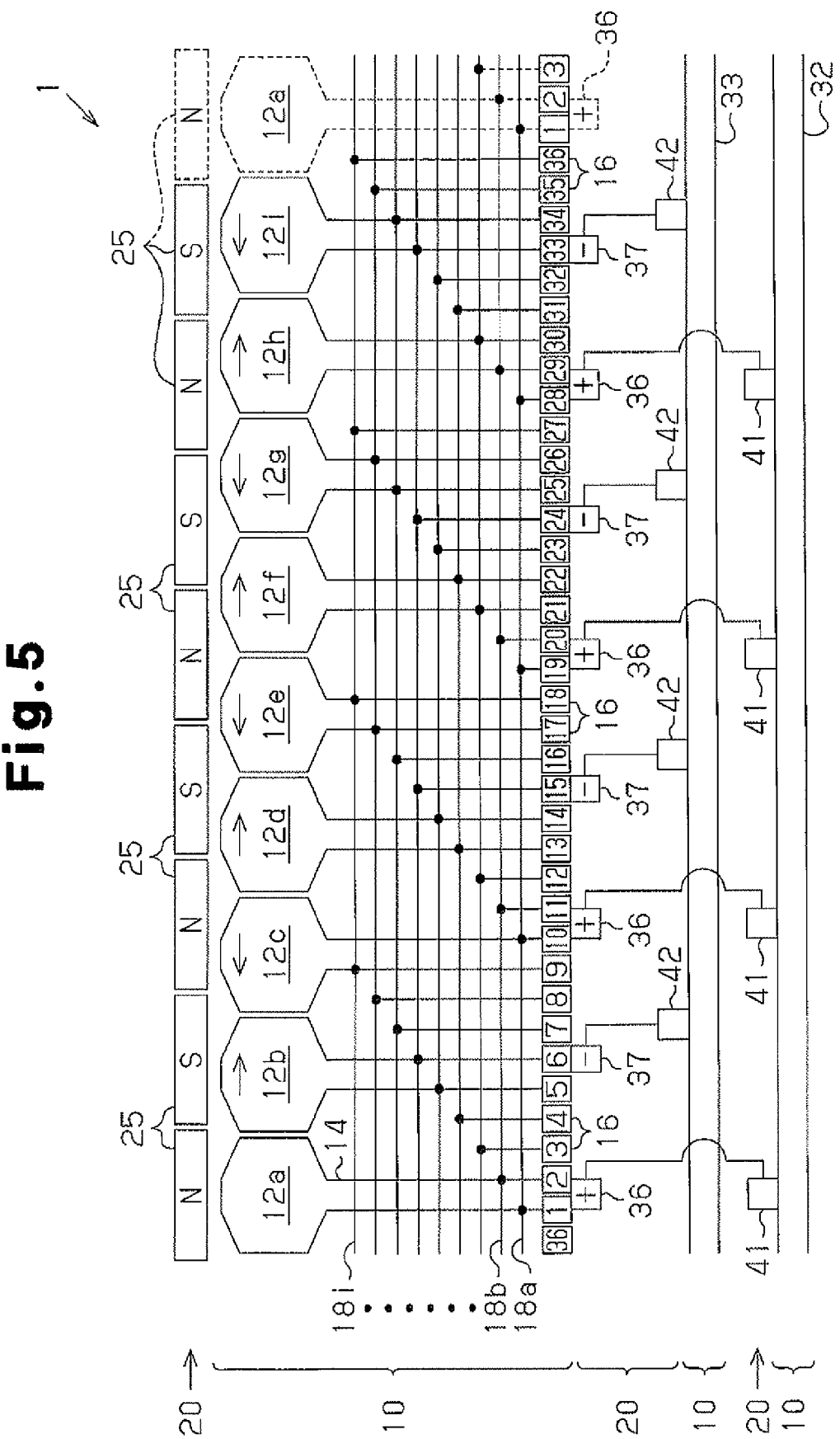
FIG. 5 is a development view of the motor according to the first embodiment.

As shown in FIG. 3, the commutator 17 is formed of a number (thirty-six in the present embodiment) of segments 16 which are aligned in the circumferential direction. As shown in FIGS. 3 and 5, numbers #1 to #36 are attached in sequence to the respective segments 16 in one circumferential direction. In addition, in the present embodiment, the #1 to #36 segments 16 are divided into nine segment groups, each of which includes four segments 16, with the first group having the first segment 16 starting with the #1 segment 16. Each of the first to ninth segment groups includes first to fourth segments 16 having sequential numbers. The first to ninth segment groups respectively correspond to the above described first to ninth coils 12a to 12i.

The first segment group includes, for example, the #1, #2, #3, and #4 segments 16. The second segment group includes the #5, #6, #7, and #8 segments 16. Lastly, the ninth segment group includes the #33, #34, #35, and #36 segments 16. It can be easily understood from the above description that each of the #1 to #36 segments 16 belongs to one of the first to eighth segment groups. In addition, the first segments of the first to ninth segment groups are the #1, #5, #9 . . . , #33 segments 16, respectively. The second segments of the first to ninth segment groups are the #2, #6, #10 . . . , #34 segments 16, respectively. The third segments of the first to ninth segment groups are the #3, #7, #11 . . . , #35 segments 16, respectively. The fourth segments of the first to ninth segment groups are the #4, #8, #12 . . . , #36 segments 16, respectively.

The first to ninth coils 12a to 12i are respectively connected to the first and second segments 16 in the corresponding segment group.

That is to say, the first coil 12a is formed of the wire 14 that extends from the #1 segment 16, is wound around the tooth 11b facing the #1 and #2 segments 16 in the direction in which the rotary shaft 21 extends, and then, connected to the #2 segment 16. The second coil 12b is formed of the wire 14 that extends from the #5 segment 16, is wound around the tooth 11b facing the #5 and #6 segments 16, and then, connected to the #6 segment 16. In the same manner, the third coil 12c is formed of the wire 14 that extends from the #9 segment 16, is wound around the tooth 11b facing the #9 and #10 segments 16, and then, connected to the #10 segment 16. The fourth coil 12d is formed of the wire 14 that extends from the #13 segment 16, is wound around the tooth 11b facing the #13 and #14 segments 16, and then, connected to the #14 segment 16.

The fifth coil 12e is formed of the wire 14 that extends from the #17 segment 16, is wound around the tooth 11b facing the #17 and #18 segments 16, and then, connected to the #18 segment 16. The sixth coil 12f is formed of the wire 14 that extends from the #21 segment 16, is wound around the tooth 11b facing the #21 and #22 segments 16, and then, connected to the #22 segment 16. The seventh coil 12g is formed of the wire 14 that extends from the #25 segment 16, is wound around the tooth 11b facing the #25 and #26 segments 16, and then, connected to the #26 segment 16. The eighth coil 12h is formed of the wire 14 that extends from the #29 segment 16, is wound around the tooth 11b facing the #29 and #30 segments 16, and then, connected to the #30 segment 16. The ninth coil 12i is formed of the wire 14 that extends from the #33 segment 16, is wound around the tooth 11b facing the #33 and 34 segments 16, and then, connected to the #34 segment 16.

In addition, each of nine short-circuit members, which are first to ninth short-circuit members 18a to 18i (see FIG. 5), connects four segments 16 at intervals of 90° to each other so that they are at the same potential. Accordingly, every eighth segment 16 has the same potential. In this connection, the angle between the segments 16 which are connected to each other, that is to say, 90°, can be obtained by an expression 360°/(number of field poles 2P/2) by using the below described number 2P of the field poles (2P=8 in the present embodiment).

Concretely, the first short-circuit member 18a connects the #1, #10, #19 and #28 segments 16 to each other. In the same manner, the second short-circuit member 18b connects the #2, #11, #20 and #29 segments 16 to each other. In addition, the third short-circuit member 18c connects the #3, #12, #21 and #30 segments 16 to each other, and the fourth short-circuit member 18d connects the #4, #13, #22 and #31 segments 16 to each other. In addition, the fifth short-circuit member 18e connects the fifth, #14, #23 and #32 segments 16 to each other, and the sixth short-circuit member 18f connects the #6, #15, #24 and #33 segments 16. In addition, the seventh short-circuit member 18g connects the #7, #16, #25 and #34 segments 16 to each other, and the eighth short-circuit member 18h connects the #8, #17, #26 and #35 segments 16 to each other. In addition, the ninth short-circuit member 18i connects the #9, #18, #27 and #36 segments 16 to each other.

Figure 4:
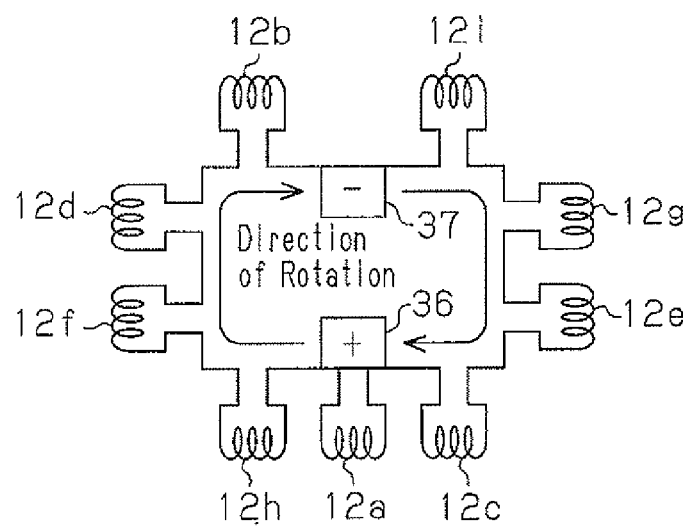
FIG. 4 is a wiring diagram of the coils according to the first embodiment.

In this manner, the first to ninth short-circuit members 18a to 18i connect four segments 16 at intervals of 90° to each other, and thereby, the segments 16 are respectively connected to the corresponding two of the first to ninth coils 12a to 12i. The #1 segment 16, for example, is connected to the first coil 12a and also connected to the third coil 12c via the first short-circuit member 18a. The #2 segment 16 is connected to the second coil 12b and also connected to the eighth coil 12h via the second short-circuit member 18b. The #3 segment 16 is connected to the sixth coil 12f and the eighth coil 12h via the third short-circuit member 18c. As a result, the first to ninth short-circuit members 18a to 18i connect the first to ninth coils 12a to 12i in series so that the first to ninth coils 12a to 12i form one closed loop as shown in FIG. 4. In this closed loop, the first to ninth coils 12a to 12i are connected in the order: the eighth coil 12h→the sixth coil 12f→the fourth coil 12d→the second coil 12b→the ninth coil 12i→the seventh coil 12g→the fifth coil 12e→the third coil 12c→the first coil 12a→the eighth coil 12h.

As shown in FIG. 1, the above described rotor 20 is provided with a rotary shaft 21 which is placed inside the armature stator 10 so as to be rotatable and a rotor core 22 which is secured to the rotary shaft 21. One end of the rotary shaft 21 is supported by a bearing 23 which is provided at the center of the first housing member 3a so as to be rotatable, and the other end of the rotary shaft 21 is supported by a bearing 24 which is provided at the center of the above described brush device housing 4 so as to be rotatable.

As shown in FIG. 2, a number (sixteen in the present embodiment) of permanent magnets 25 are embedded in the rotor core 22. That is to say, the motor 1 according to the present embodiment is an interior permanent magnet motor (IPM motor). In the present embodiment, two permanent magnets 25 having the same magnetic pole in a cross section perpendicular to the rotary shaft 21 are arranged so as to form a V shape which spreads toward the outside in the radial direction and form one field pole. Accordingly, eight field poles are formed of sixteen permanent magnets 25. The number 2P of the field poles in the present embodiment is eight. The eight field poles include four N poles and four N poles in a cross section perpendicular to the rotary shaft 21 in such a manner that the N poles and the S poles are alternately arranged in the circumferential direction. The maximum energy product of the permanent magnets 25 is set at a value of no less than 100 kJ/m³. In addition, in each of FIG. 5 to FIG. 7, the eight field poles are illustrated as eight rectangles. That is to say, a field pole formed of two permanent magnets 25 is illustrated as one rectangle.

The number Q (Q=9 in the present embodiment) of the above described coils is set on the basis of the number 2P (2P=8 in the present embodiment) of the field poles. In particular, the number of coils Q is different from the number 2P of the field poles, greater than the number of field poles 2P×¾ (six in the present embodiment) and smaller than the number of field poles 2P×3/2 (twelve in the present embodiment).

FIG. 8 is a table showing the relationship between the number of field poles 2P and the number of coils Q. FIG. 8 shows the short pitch factor, the number of parallel circuits (the number of parallel circuits which are formed between the anode side commutating brush 36 and the cathode side commutating brush 37), the commutated voltage and the number of segments 16 when the number of coils Q is three to fifteen in the respective cases where the number of field poles 2P is two, four, six, eight, and ten. In addition, in FIG. 8, pieces of data, such as the short pitch factor, are surrounded by thick frames in the case where the number of coils Q is set so as to be different from the number of field poles 2P, greater than the number of field poles 2P×¾ and smaller than the number of field poles 2P×3/2. As can be seen from FIG. 8, the short pitch factors in the portions surrounded by the thick frames have values which are greater than the short pitch factor (0.866) of a conventional motor in which the number of field poles 2P is two and the number of coils Q is three.

The short pitch factor is a factor gained by taking gaps between the coils relative to the pitch of the magnetic poles into consideration in the case where the wire 14 is wound in a short pitch winding manner. Concretely, the short pitch factor K can be represented in the following formula using the number of field poles 2P and the number of coils Q.

$$K = \sin((\pi/2) + (2P/Q))$$

The short pitch factor K represented in the above formula is proportional to the output of the direct current motor 1. That is to say, the greater the short pitch factor K is, the greater the output of the direct current motor 1 is.

In the present embodiment, in order to make the short pitch factor K of the motor 1 to be greater than that of the motor in which the number of field poles 2P is two and the number of coils Q is three, the number of coils Q is set so as to be different from the number of field poles 2P and contained within a range which is greater than the number of field poles 2P×¾ and smaller than the number of field poles 2P×½. The number of field poles 2P in the present embodiment is eight, and therefore, the number of coils Q must be within a range of 6<Q<12, from which the number of field poles 2P, which is eight, is excluded, and thus, set at a value from among seven, nine, ten, and eleven. In the present embodiment, the number of coils Q is set at nine. As shown in FIG. 8, the short pitch factor K of the motor 1, in which the number of field poles 2P is eight and the number of coils Q is nine, is 0.985.

In addition, the number of segments 16 which form the above described commutator 17 is set at the (number of field poles 2P)/2×Q, that is P×Q. In the present embodiment, P is four and Q is nine, and therefore, the number of segments 16 is set at thirty six.

As shown in FIG. 1, the above described brush device housing 4 contains the power supplying part 30 and the brush device 31. The power supplying part 30 is provided with an anode side slip ring 32 having a small diameter and a cathode side slip ring 33 having a large diameter, which are arranged in concentric form. The slip rings 32 and 33 are secured to the bottom of the brush device housing 4. These two slip rings 32 and 33 are connected to an external power supplying apparatus, not shown, which supplies a current to the motor 1.

The brush device 31 is provided with a brush holder 34 in flat columnar form having a through hole at the center. The rotary shaft 21 of the rotor 20 is inserted through the above described through hole of the brush holder 34. The brush holder 34 is secured to the rotor core 22 with a screw 35 and rotates together with the rotary shaft 21. In the brush holder 34, a number of commutating brush containing recesses 34a (eight in the present embodiment) (only one is illustrated in FIG. 1) having an opening facing the commutator 17 are formed at equal angular intervals in the circumferential direction. In the eight commutating brush containing recesses 34a, four anode side commutating brushes 36 (only one is shown in FIG. 1) and four cathode side commutating brushes 37 (see FIG. 3) are contained and alternate in the circumferential direction. In particular, in the present embodiment, the number of field poles 2P/2 anode side commutating brushes 36 and cathode side commutating brushes 37 are respectively provided. In addition, the anode commutating brushes 36 and the cathode side commutating brushes 37 are arranged at intervals of an angle which is determined by multiplying 360°/number of field poles 2P=360°/8=45° by an odd number (45° in the present embodiment). The anode side commutating brushes 36 and the cathode side commutating brushes 37 are respectively urged toward the commutator 17 by coil springs 38 which are contained in corresponding commutating brush containing recesses 34a, and make contact with and slide against the commutator 17. FIG. 4 shows a total of four anode side commutating brushes 36 collectively in one block with a plus sign attached. Likewise, a total of four cathode side commutating brushes 37 are shown collectively in one block with a minus sign attached.

In addition, in the brush holder 34, a number of power supplying brush containing recesses 34b having an opening facing the power supplying part 30 (eight in the present embodiment; only two are shown in FIG. 1) are created. The eight power supplying brushes containing recesses 34b contain four anode side power supplying brushes 41 and four cathode side power supplying brushes 42 which alternate in the circumferential direction. The anode side power supplying brushes 41 respectively face the anode side slip ring 32 and are arranged in the same location as the anode side commutating brushes 36 in the circumferential direction. In addition, the anode side power supplying brushes 42 respectively face the cathode side slip ring 33. The power supplying brush containing recesses 34b each contain a coil spring 43. The coil springs 43 make the anode side power supplying brushes 41 make contact with and slide against the anode side slip ring 32, and make the cathode side power supplying brushes 42 make contact with and slide against the cathode side slip ring 33.

Each of the anode side power supplying brushes 41 is electrically connected to one of the anode side commutating brushes 36. An anode side commutating brush 36 and an anode side power supplying brush 41 which are connected to each other form an anode side brush device. A current flows from the slip ring 32 to the anode side commutating brush 36 via the anode side power supplying brush 41. In the same manner, each of the cathode side power supplying brushes 42 is electrically connected to one of the cathode side commutating brushes 37. A cathode side commutating brush 37 and a cathode side power supplying brush 42 which are connected to each other form a cathode side brush device. A current flows from the cathode side commutating brush 37 to the slip ring 33 via the cathode side power supplying brush 42.

When a current is supplied to the motor 1 which is formed as described above, the current is supplied from the anode side slip ring 32 to the first to ninth coils 12a to 12i of the armature stator 10 via the anode side power supplying brushes 41, the anode side commutating brushes 36 and the commutator 17. Then, the first to ninth coils 12a to 12i to which the current is supplied generate a rotational magnetic field, and thus, the rotor 20 rotates. When the rotor 20 rotates, the brush device 31 rotates together with the rotation of the rotor, and segments 16 which make contact with and slide against the anode side commutating brushes 36 and the cathode side commutating brushes 37 are switched. Together with this, the first to ninth coils 12a to 12i are commutated in sequence, and the first to ninth coils 12a to 12i to which a current is supplied are switched in sequence, and the magnetic field generated by these first to ninth coils 12a to 12i is switched in sequence. As a result, the rotor 20 rotates continuously. Here, the current that is supplied to the first to ninth coils 12a to 12i flows from the commutator 17 through the cathode side commutating brushes 37 and the cathode side power supplying brushes 42, and after that, reaches the power supplying apparatus via the cathode side slip ring 33.

As shown in FIGS. 4 and 5, for example, one of the anode side commutating brushes 36 is positioned in such a manner as to cross the #1 and #2 segments 16. This anode side commutating brush 36 connects the #1 segment 16 to the #2 segment 16. That is to say, the first coil 12a is connected through the anode side commutating brush 36. Accordingly, no current flows through the first coil 12a, and the first coil 12a does not generate a magnetic flux. In addition, as shown in FIG. 4, between the anode side commutating brush 36 and the cathode side commutating brush 37, the first to ninth coils 12a to 12i are connected in series through the first to ninth short-circuit members 18a to 18l so as to form one closed loop, and therefore, the eighth coil 12h, the sixth coil 12f, the fourth coil 12d and the second coil 12b are in such a state as to be connected in series, and the third coil 12c, the fifth coil 12e, the seventh coil 12g and the ninth coil 12i are in such a state as to be connected in series. That is to say, in the state shown in FIGS. 4 and 5, one parallel circuit is formed between the anode side commutating brush 36 and the cathode side commutating brush 37 by connecting a first series circuit formed of the eighth coil 12h, the sixth coil 12f, the fourth coil 12d and the second coil 12b and a second series circuit formed of the third coil 12c, the fifth coil 12e, the seventh coil 12g and the ninth coil 12i in parallel. A current flows through the second to ninth coils 12b to 12i; that is, the eight coils excluding the first coil 12a, and these second to ninth coils 12b to 12i generate a magnetic flux. In FIG. 5, the arrows in the second to ninth coils 12b to 12i respectively indicate the direction in which the current flows, that is to say, schematically indicate the direction of the magnetic flux generated by the first to ninth coils 12a to 12i.

Figure 6:
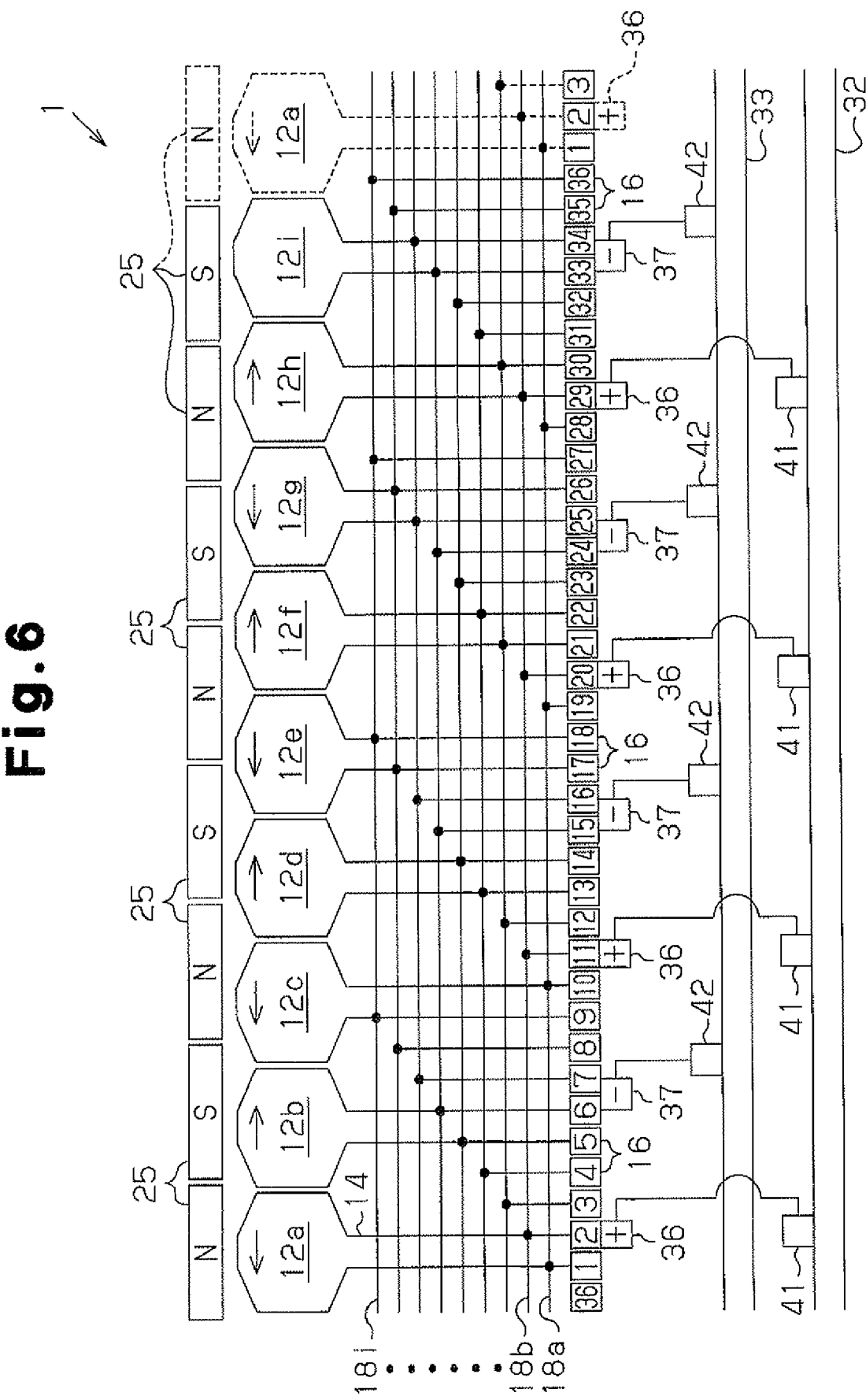
FIG. 6 is a development view of the motor according to the first embodiment.

FIG. 6 shows a development of the motor 1 in a state where the rotor 20 has rotated by half the width of the segments 16 in the circumferential direction from the state shown in FIG. 5. At this time, one of the cathode side commutating brushes 37 lies over the #33 and #34 segments 16. Accordingly, no current flows through the ninth coil 12i, and the ninth coil 12i does not generate a magnetic flux. In addition, between the anode side commutating brush 36 and the cathode side commutating brush 37, the first coil 12a, the third coil 12c, the fifth coil 12e and the seventh coil 12g are in such a state as to be connected in series, and the eighth coil 12h, the sixth coil 12f, the fourth coil 12d and the second coil 12b are in such a state as to be connected in series. Accordingly, a current flows through the first to eighth coils 12a to 12h, that is, eight coils, excluding the ninth coil 12i, so that a magnetic flux is generated.

Figure 7:
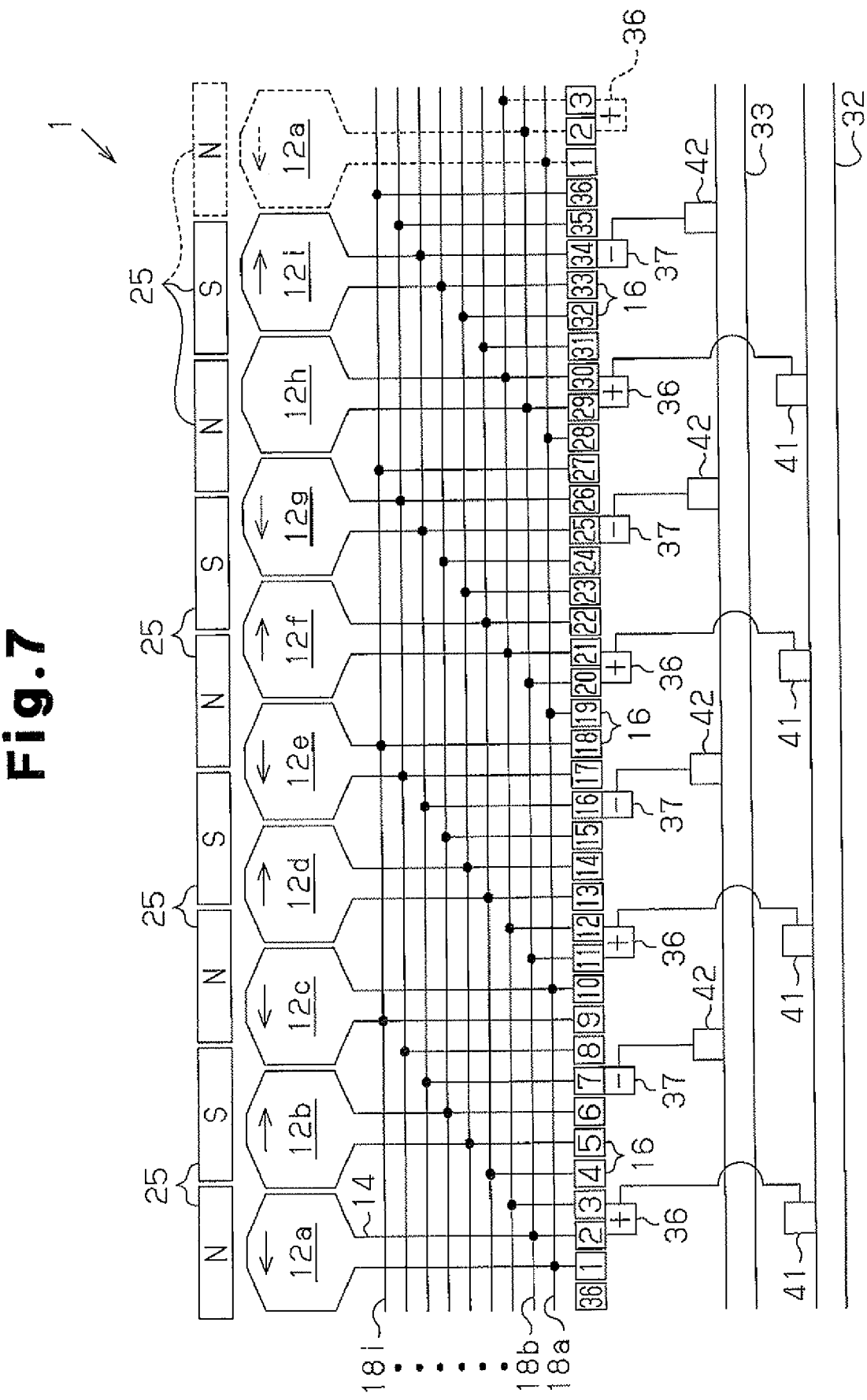
FIG. 7 is a development view of the motor according to the first embodiment.

FIG. 7 shows a development of the motor 1 in a state where the rotor 20 has rotated by half the width of the segments 16 in the circumferential direction from the state shown in FIG. 6. At this time, one of the anode side commutating brushes 36 lies over the #29 and #30 segments 16. Accordingly, no current flows through the eighth coil 12h, and the eighth coil 12h does not generate a magnetic flux. In addition, between the anode side commutating brush 36 and the cathode side commutating brush 37, the first coil 12a, the third coil 12c, the fifth coil 12e and the seventh coil 12g are in such a state as to be connected in series, and the sixth coil 12f, the fourth coil 12d, the second coil 12b and the ninth coil 12i are in such a state as to be connected in series. Accordingly, a current flows through the first to seventh coils 12a to 12g and the ninth coil 12i, that is, eight coils, excluding the eighth coil 12h, so that a magnetic flux is generated. In the case of FIG. 6, no current flows through the ninth coil 12i, while a current flows through the ninth coil 12i in FIG. 7, in the direction opposite to that in the case of FIG. 5, and the direction of the magnetic flux that is generated becomes the opposite.

As is clear from the above description, the anode side commutating brush 36 and the cathode side commutating brush 37 shown in FIG. 4 move along one closed loop formed of the first to ninth coils 12a to 12i, that is, nine coils, when a current is supplied to the motor 1 and the rotor 20 rotates. In FIG. 4, the anode side commutating brush 36 and the cathode side commutating brush 37 rotate in the clockwise direction along the closed loop formed of the first to ninth coils 12a to 12i. In addition, four segments 16 at intervals of an angle which is found in 360°/(number of field poles 2P/2), that is, 90°, are connected to each other through one of the first to ninth short-circuit members 18a to 18i. The angle between the anode side commutating brush 36 and the cathode side commutating brush 37 is an angle gained by multiplying 360°/number of field poles 2P by an odd number. Therefore, no current flows through one of the first to ninth coils 12a to 12i, because it is connected to the anode side commutating brush 36 or the cathode side commutating brush 37 while the rotor 20 rotates. The one coil from among the first to ninth coils 12a to 12i through which no current flows switches in sequence as a result of the rotation of the anode side commutating brush 36 and the cathode side commutating brush 37 together with the rotor 20. In this manner, the direction of the current that is supplied to the first to ninth coils 12a to 12i switches in sequence, and the magnetic flux generated by the first to ninth coils 12a to 12i changes.

Figure 9:
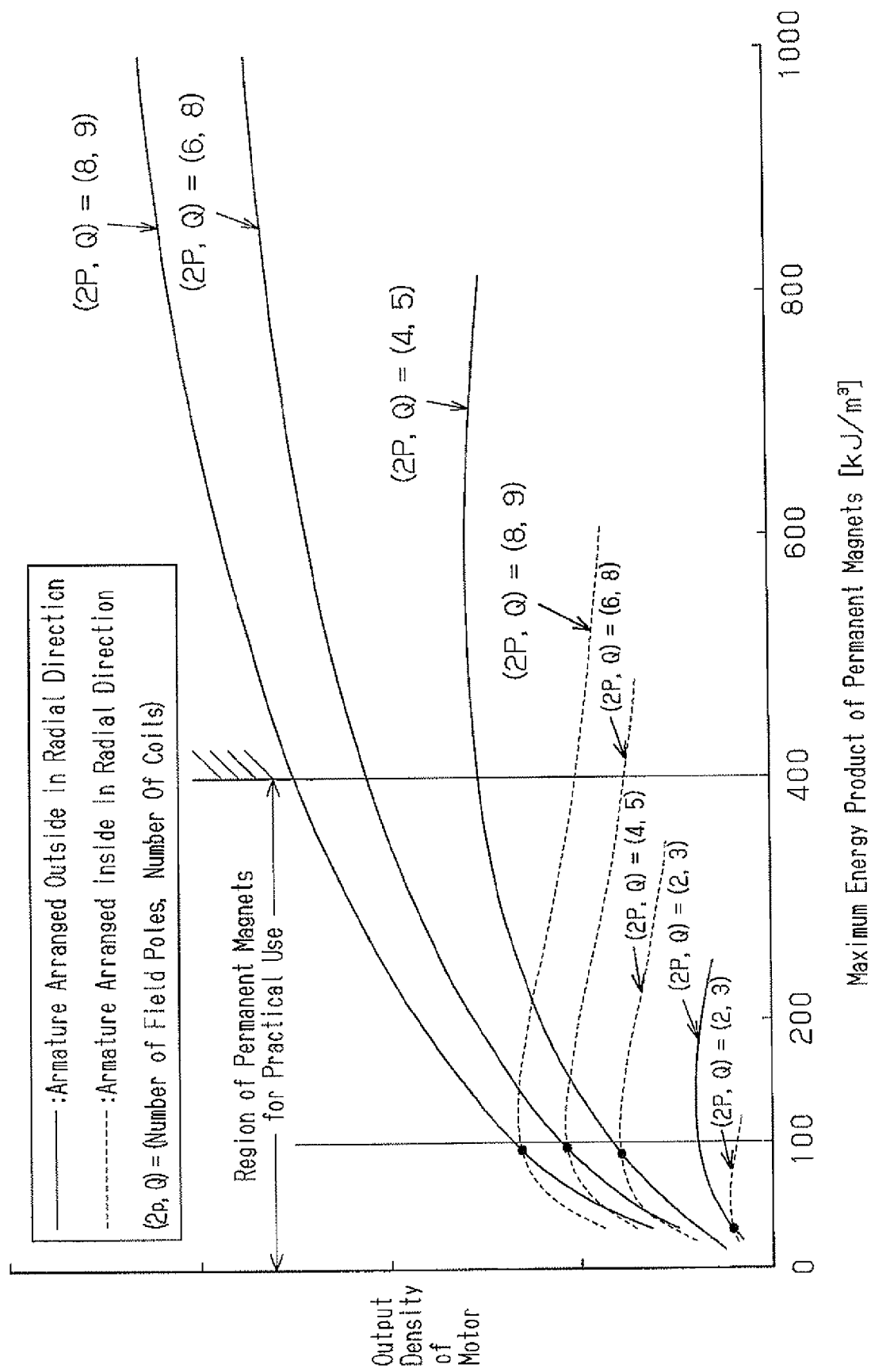
FIG. 9 is a graph showing the relationship between the maximum energy product of permanent magnets and the output density of the motor.

FIG. 9 is a graph showing the relationship between the maximum energy product of permanent magnets and the output density of the motor. The solid lines in FIG. 9 show data for a motor in which the armature (armature stator 10) is arranged outside the field poles (permanent magnets 25) in the radial direction, and the broken lines show data for a motor in which the armature is arranged inside the field poles in the radial direction for four different states, where the combination of the number of field poles 2P and the number of coils Q is (2P, Q)=(2, 3), (4, 5), (6, 8) and (8, 9). Here, the maximum energy product of practical permanent magnets is no greater than 400 kJ/m$^3$.

As can be seen from the data shown by broken lines in FIG. 9, the output density of the motor increases as the maximum energy product increases, within such a range that the maximum energy product of the permanent magnets is from 0 kJ/m$^3$ to 100 kJ/m$^3$ in the motors in which the armature is arranged inside the field poles in the radial direction, excluding the motor in which (2P, Q)=(2, 3). However, in the case where the maximum energy product of the permanent magnets exceeds 100 kJ/m$^3$, the output density of motors in which the armature is arranged inside the field poles in the radial direction decreases as the maximum energy product increases. In addition, as can be seen from the data shown by solid lines in FIG. 9, the output density of the motors in which the armature is arranged outside the field poles in the radial direction and the number of field poles is no less than four increases as the maximum energy product of the permanent magnets increases, irrespectively of whether or not the maximum energy product is less than 100 kJ/m$^3$.

Here, as for the motors in which (2P, Q)=(8, 9), the output density of motors in which the armature is arranged inside the field poles in the radial direction (broken lines) is greater than that of motors in which the armature is arranged outside the field poles in the radial direction (solid lines), within a range where the maximum energy product of the permanent magnets is from 0 kJ/m$^3$ to 100 kJ/m$^3$. However, within a range where the maximum energy product of the permanent magnets is no less than 100 kJ/m$^3$, the output density of motors in which the armature is arranged outside the field poles in the radial direction (solid lines) is greater than that of motors in which the armature is arranged inside the field poles in the radial direction (broken lines). Furthermore, in motors in which the armature is arranged outside the field poles in the radial direction (solid lines), the output density of the motor increases as the maximum energy product of the permanent magnets increases, and the output density within a range where the maximum energy product of the permanent magnets is no less than 100 kJ/m$^3$ is greater than the output density within a range where the maximum energy product of the permanent magnet is from 0 kJ/m$^3$ to 100 kJ/m$^3$. These characteristics are the same for motors in which (2P, Q)=(4, 5) or (6, 8). That is to say, in motors in which the armature is arranged inside the field poles in the radial direction (broken lines), the output density decreases as the maximum energy product increases past 100 kJ/m$^3$, while in motors in which the armature is arranged outside the field poles in the radial direction (solid lines), the output density keeps increasing even when the maximum energy product increases past 100 kJ/m$^3$.

In addition, as for motors in which (2P, Q)=(2, 3), it can be seen from FIG. 9 that the output density of motors in which the armature is arranged outside the field poles in the radial direction (solid lines) is greater than that of motors in which the armature is arranged inside the field poles in the radial direction (broken lines).

It can be seen from the above that within a range where the maximum energy product of the permanent magnets is no less than 100 kJ/m$^3$, motors in which the armature is arranged outside the field poles in the radial direction and any one of the four combinations: (2P, Q)=(2, 3), (4, 5), (6, 8) and (8, 9), is set (solid lines) have an output density that is greater than that of motors in which the armature is arranged inside the field poles in the radial direction (broken lines). Furthermore, it can be seen from FIG. 9 that within a range where the maximum energy product of the permanent magnets is no less than 100 kJ/m$^3$, motors in which the armature is arranged outside the field poles in the radial direction and the number of field poles 2P is set at a value of no less than four (solid lines) have an output density that is greater than that of motors in which the armature is arranged inside the field poles in the radial direction (broken lines). The motor 1 of the present embodiment is provided with an armature stator 10 having first to ninth coils 12a to 12i, that is, nine coils, which is arranged outside in the radial direction, and a rotor 20 having permanent magnets 25 having eight field poles, which is arranged inside in the radial direction. The maximum energy product of the permanent magnets 25 of the motor 1 is set at a value of no less than 100 kJ/m$^3$. The motor 1 gains an output density which is greater than that of motors having an armature having nine coils which is arranged inside the eight field poles in the radial direction (broken lines).

The above described present embodiment has the following advantages.

(1) The armature stator 10 is arranged outside the rotor 20 in the radial direction. Accordingly, the surface area of the armature stator 10 per angle unit is broader than in the case where the armature stator 10 is arranged inside the rotor 20. The commutator 17, which is secured to this armature stator 10, can be easily provided in a complicated configuration, and provided with a large number of segments 16. Accordingly, wiring to all of the first to ninth coils 12a to 12i becomes easy.

(2) The first to ninth coils 12a to 12i, that is, nine coils, which are provided to the armature stator 10, are respectively connected to a number of segments 16 of the commutator 17. The anode side commutating brush 36 and the cathode side commutating brush 37 which make contact with and slide against the commutator 17 rotate together with the rotor 20 and supply a current to and commutate the first to ninth coils 12a to 12i. Accordingly, it is possible to commutate a current for each of the first to ninth coils 12a to 12i without using a control circuit in the motor 1 having a configuration where the armature stator 10 having the first to ninth coils 12a to 12i is arranged outside the rotor 20. In addition, the configuration can be made so that only the coil which is connected to either the anode side commutating brush 36 or the cathode side commutating brush 37 does not generate a magnetic flux. As a result, the efficiency of use of first to ninth coils 12a to 12i can be increased in comparison with conventional motors.

(3) The number of segments 16 of the commutator 17 can be easily calculated as P×Q using the number of field poles 2P and the number of coils Q. Accordingly, the motor 1 can be easily designed.

(4) Four segments 16 at intervals of the angle of 90° found in 360°/(number of field poles 2P/2) are connected to any of the first to ninth coils 12a to 12i, that is, nine coils, through one of the first to ninth short-circuit members 18a to 18i. The first to ninth coils 12a to 12i, that is, nine coils, are connected in series so as to form one closed loop. The angle between the anode side commutating brush 36 and the cathode side commutating brush 37 is set at an angle which is gained by multiplying 360°/number of field poles 2P by an odd number, that is to say, 45°, which is gained by multiplying 45° by one in the present embodiment. When the rotor 20 rotates in this motor 1, the anode side commutating brush 36 and the cathode side commutating brush 37 move along one closed loop formed of the first to ninth coils 12a to 12i, that is, nine coils. Then, a current flows through the coils, excluding the coil which is connected to either the anode side commutating brush 36 or the cathode side commutating brush 37, so that a magnetic flux is generated. That is to say, at all times, there is one coil from among the first to ninth coils 12a to 12i, that is, nine coils, to which no current is supplied, and therefore, the efficiency of use of the first to ninth coils 12a to 12i can be increased without fail, in comparison with conventional motors. In addition, a parallel circuit is formed of eight of the first to ninth coils 12a to 12i, that is, nine coils, between the anode side commutating brush 36 and the cathode side commutating brush 37, when the motor 1 is driven. Accordingly, a current can be appropriately commutated with a small voltage individually applied to the first to ninth coils 12a to 12i.

(5) The number of field poles 2P and the number of coils Q in the motor 1 are set at (2P, Q)=(8, 9). The maximum energy product of the field poles (permanent magnets 25) is greater than 100 kJ/m$^3$. In addition, the armature stator 10 is arranged outside the rotor 20 having eight field poles formed of permanent magnets 25 in the radial direction. Accordingly, within a range where the maximum energy product of the permanent magnets is no less than 100 kJ/m$^3$, the motor 1 gains a high output density in comparison with motors in which the armature stator 10 is arranged inside the rotor 20 in the radial direction for the same number of field poles 2P and the same number of coils Q, which are (2P, Q)=(8, 9). As a result, the motor 1 gains a high output in comparison with motors in which the armature stator 10 is arranged inside the rotor 20 in the radial direction for the same number of field poles 2P and the same number of coils Q, which are (2P, Q)=(8, 9).

(6) In the present embodiment, where the number of field poles 2P is eight, the number of coils Q is set at nine, so that it is different from the number of field poles 2P within such a range that it is greater than number of field poles 2P×¾ and smaller than number of field poles 2P×³⁄₂. The number of coils Q can be set in this manner, and thus, the motor 1 having a short pitch factor (0.985) which is greater than the short pitch factor of conventional motors (0.866), where the number of field poles 2P is two and the number of coils Q is three, can be implemented. Accordingly, the motor 1 can gain an output which is greater than that of conventional motors. In addition, as can be seen from FIG. 8, as the number of coils Q is set in this manner, the commutated voltage of the motor according to the present embodiment (2.7 V) is smaller than the commutated voltage of conventional motors (8 V).

(7) The first to ninth coils 12a to 12i are respectively wound around the teeth 11b of the stator core 11 in the form of concentrated winding. Accordingly, the first to ninth coils 12a to 12i can respectively generate an N pole and an S pole clearly.

(8) The first to ninth short-circuit members 18a to 18i respectively connect four segments 16 to each other at intervals of 90°, so that they have the same potential. Furthermore, four anode side commutating brushes 36 and four cathode side commutating brushes 37 make contact with and slide against the commutator 17. Accordingly, inconsistency in the supply of a current to the first to ninth coils 12a to 12i can be reduced, and sparks can be prevented from being created. Accordingly, the damage caused to the commutator 17, the anode side commutating brushes 36 and the cathode side commutating brushes 37 can be reduced.

(9) The rotor 20 is of an interior permanent magnet type, where the permanent magnets 25 are embedded in the rotor core 22. Accordingly, the torque of the motor 1 can be increased, by positively using the reluctance torque.

(10) The commutator 17 is secured to the armature stator 10 instead of the rotor 20. Accordingly, it is difficult for the commutator 17 to vibrate, even when the rotor 20 rotates, and therefore, a current can be easily commutated without fail.

(11) The commutator 17 is arranged so as to face the teeth 11b. Accordingly, the distance between the commutator 17 (segments 16) and the first to ninth coils 12a to 12i can be made short, making the wires 14 short.

(12) The anode side commutating brushes 36 and the cathode side commutating brushes 37 are urged in the direction from the brush holder 34 toward the first to ninth coils 12a to 12i, and make contact with and slide against the commutator 17 in annular form. The anode side power supplying brush 41 and the cathode side power supplying brush 42 are urged in the direction from the brush holder 34 toward the side opposite to the first to ninth coils 12a to 12i, and respectively make contact with and slide against the slip rings 32 and 33. In other words, the brushes 36, 37, 41 and 42 are arranged between the slip rings 32 and 33 and the commutator 17 in the direction in which the rotary shaft 21 extends. Accordingly, the position of the brush holder 34 is stable in the axial direction. As a result, the commutating brushes 36 and 37 can stably make contact with and slide against the commutator 17.

A second embodiment of the present invention will now be described with reference to the drawings. Like or the same reference numerals are given to those components that are like or the same as the corresponding components of the first embodiment and detailed explanations are omitted.

Figure 10:
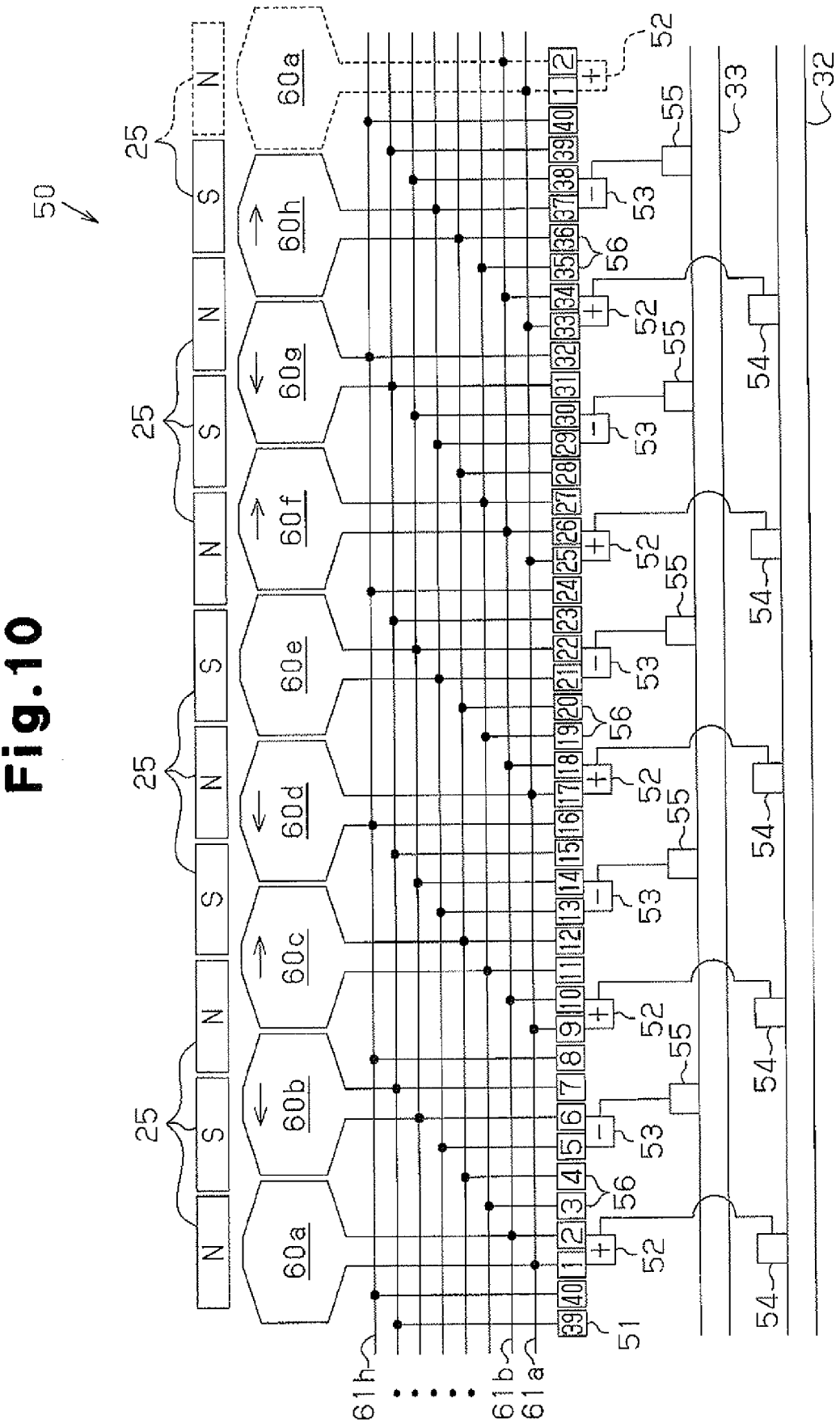
FIG. 10 is a development view of the motor according to a second embodiment of the present invention.

FIG. 10 shows a development of the motor 50 according to the present embodiment. The motor 50 of the present embodiment is different from the motor 1 of the above described first embodiment in the number of field poles 2P formed of permanent magnets 25, the number of coils Q provided in the armature stator 10, the number of segments 56 of the commutator 51, the number of anode side commutating brushes 52 and cathode side commutating brushes 53, and the number of anode side power supplying brushes 54 and cathode side power supplying brushes 55.

The rotor 20 of the motor 50 has ten field poles. That is to say, the number of field poles 2P is ten in the motor 50. In addition, the number of coils Q in the motor 50 is set at a value which is different from the number of field poles 2P within such a range that the value is greater than the number of field poles 2P×¾ and smaller than the number of field poles 2P×3/2, as in the first embodiment. That is to say, the number of coils Q is set at a value from eight, nine, eleven, twelve, thirteen, and fourteen, which are within a range of ($15/2$)<Q<15, and exclude the number ten of field poles in the present embodiment, because the number of field poles 2P is ten. The number of coils Q is set at eight in the present embodiment. It can be seen from FIG. 8 that the short pitch factor K of the motor 1, in which the number of field poles 2P is ten and the number of coils Q is eight, is 0.924.

The number of segments 56 which form the commutator 51 is also set at (number of field poles 2P/2)×Q, that is, P×Q, as in the above described first embodiment. In the present embodiment, P is five and Q is eight, and therefore, the number of segments is set at forty.

As shown in FIG. 10, numbers 1 to 40 are attached to the respective segments 56 in sequence in one direction in the circumference. In addition, in the present embodiment, segments are referred to as first to fifth segments in one direction in the circumference starting from the #1 segment 56, and eight groups of such first to fifth segments are set. That is to say, there are eight segment groups, each of which includes first to fifth segments. The first segment group includes five segments 56, or #1, #2, #3, #4 and #5 segments 56. The second segment group includes the #6, #7, #8, #9 and #10 segments 56. The eighth and last segment group includes #36, #37, #38, #39 and #40 segments 56. In other words, the first segments of the first to eighth segment groups are, respectively, the #1, #6 . . . , #36 segments 56. The second segments of the first to eighth segment groups are, respectively, the #2, #7 . . . , #37 segments 56, the third segments are the #3, #8 . . . , #38 segments 56, the fourth segments are the #4, #9 . . . , #39 segments 56, and the fifth segments are the #5, #10, #40 segments 56.

The first to eighth coils 60a to 60h are respectively connected to the first and second segments in the corresponding segment group.

That is to say, the first coil 60a is formed of a wire 14 which extends from the #1 segment 56, and is wound around the tooth 11b facing the #1 and #2 segments 56 and connected to the #2 segment 56. The second coil 60b is formed of a wire 14 which extends from the #6 segment 56, and is wound around the tooth 11b facing the #6 and #7 segments 56 and connected to the #7 segment 56. The third coil 60c is formed of a wire 14 which extends from the #11 segment 56, and is wound around the tooth 11b facing the #11 and #12 segments 56 and connected to the #12 segment 56. The fourth coil 60d is formed of a wire 14 which extends from the #16 segment 56, and is wound around the tooth 11b facing the #16 and #17 segments 56 and connected to the #17 segment 56. The coil 60e is formed of a wire 14 which extends from the #21 segment 56, and is wound around the tooth 11b facing the #21 and #22 segments 56 and connected to the #22 segment 56. The sixth coil 60f is formed of a wire 14 which extends from the #26 segment 56, and is wound around the tooth 11b facing the #26 and #27 segments 56 and connected to the #27 segment 56. The seventh coil 60g is formed of a wire 14 which extends from the #31 segment 56, and is wound around the tooth 11b facing the #31 and #32 segments 56 and connected to the #32 segment 56. The eighth coil 60h is formed of a wire 14 which extends from the #36 segment 56, and is wound around the tooth 11b facing the #36 and #37 segments 56 and connected to the #37 segment 56.

In addition, segments 56 at intervals of 72°, that is to say, every seven segments 56, are connected to each other with first to eighth short-circuit members 61a to 61h, so that these segments 56 have the same potential. The angle between the connected segments 56 (72°) is an angle which is found in 360°/(number of field poles 2P/2).

That is to say, the first short-circuit member 61a connects the #1, #9, #17, #25 and #33 segments 56 to each other, the second short-circuit member 61b connects the #2, #10, #18, #26 and #34 segments 56 to each other. In addition, the third short-circuit member 61c connects the #3, #11#19, #27 and #35 segments 56 to each other, and the fourth short-circuit member 61d connects the #4, #12, #20, #28 and #36 segments 56 to each other. In addition, the fifth short-circuit member 61e connects the #5, #13, #21, #29 and #37 segments 56 to each other, and the sixth short-circuit member 61f connects the #6, #14, #22, #30 and #38 segments 56 to each other. In addition, the seventh short-circuit member 61g connects the #7, #15, #23, #31 and #39 segments 56 to each other, and the eighth short-circuit member 61h connects the #8, #16, #24, #32 and #40 segments 56 to each other.

Figure 12:
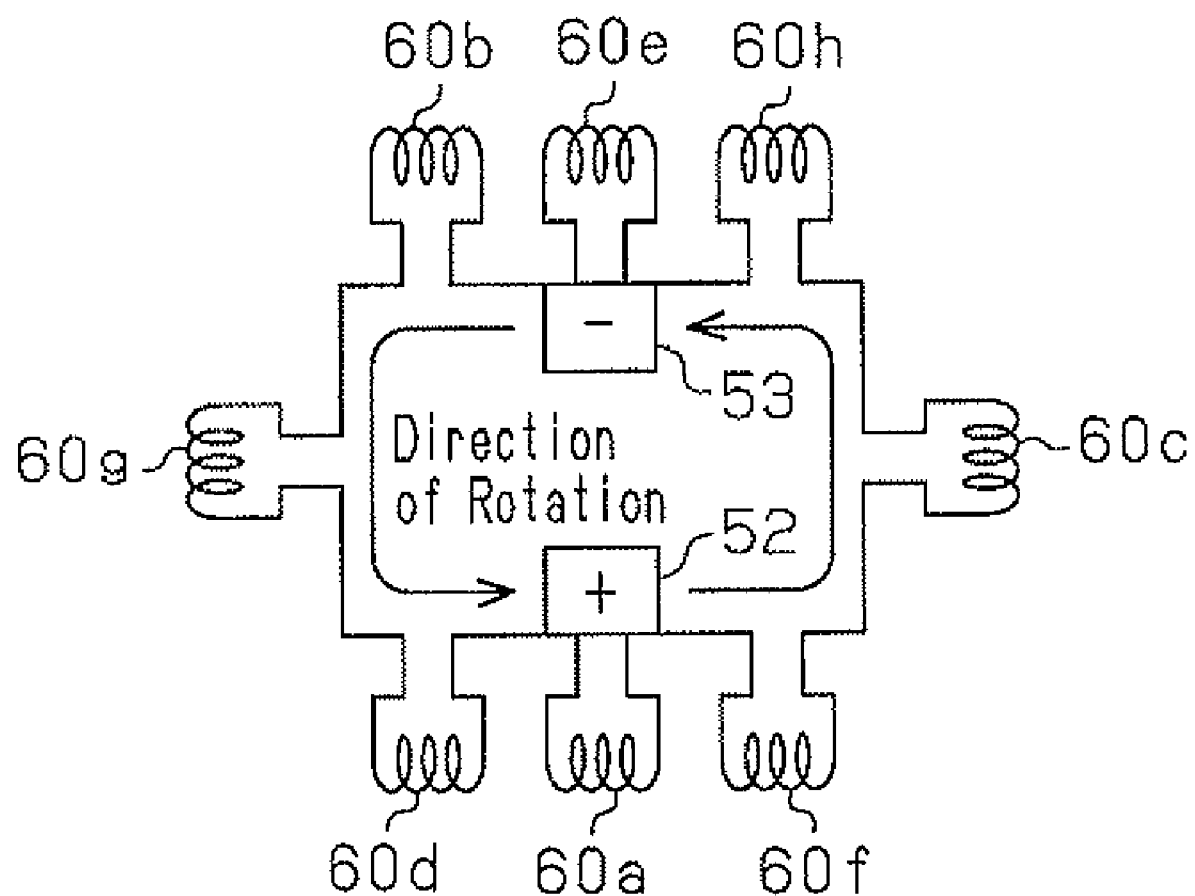
FIG. 12 is a wiring diagram of the coils of FIG. 10.

In this manner, five segments 56 at intervals of 72° are connected to each other through the first to eighth short-circuit members 61a to 61h, and thus, each segment 56 is connected to one of the first to eighth coils 60a to 60h. In addition, the first to eighth coils 60a to 60h are connected in series through each of the first to eighth short-circuit members 61a to 61h, as shown in FIG. 12, and form one closed loop (the fourth coil 60d→the seventh coil 60g→the second coil 60b→the fifth coil 60e→the eighth coil 60h→the third coil 60c→the sixth coil 60f→the first coil 60a→the fourth coil 60d).

In addition, anode side commutating brushes 52, the number of which is represented by the number of field poles 2P/2, and cathode side commutating brushes 53, number of field poles 2P/2, are provided in the motor 50 in the same manner as in the above described first embodiment. That is to say, ten brushes; five anode side commutating brushes 52 and five cathode side commutating brushes 53, are provided in total. The angle between the anode side commutating brushes 52 and the cathode side commutating brushes 53 is set at an angle which is gained by multiplying 360°/number of field poles 2P by an odd number (36° in the present embodiment). The anode side commutating brushes 52 and the cathode side commutating brushes 53 are contained in a brush holder 34 (see FIG. 1) in such a manner as to be aligned alternately in the circumferential direction.

Ten power supplying brushes; five anode side power supplying brushes 54 which are electrically connected to the anode side commutating brushes 52 and five cathode side power supplying brushes 55 which are electrically connected to the cathode side commutating brushes 53, are provided in total.

In the motor 50 which is formed as described above, for example, in the state shown in FIG. 10, one of the anode side commutating brushes 52 is positioned so as to cross the #1 and #2 segments 56, and one of the cathode side commutating brushes 53 is positioned so as to cross the #21 and #22 segments 56. At this timer the first coil 60a is connected through the anode side commutating brush 52 which lies over the #1 and #2 segments 56, and therefore, no current flows through the first coil 60a and no magnetic flux is generated. In the same manner, the fifth coil 60e is connected through the cathode side commutating brush 53 which lies over the #21 and #22 segments 56, and therefore, no current flows through this fifth coil 60e and no magnetic flux is generated by the coil 60e. In addition, the first to eighth coils 60a to 60h are respectively connected to the first to eighth short-circuit members 61a to 60h, and therefore, the fourth coil 60d, the seventh coil 60g and the second coil 60b are in such a state as to be connected in series between the anode side commutating brush 52 and the cathode side commutating brush 53, and the sixth coil 60f, the third coil 60c and the eighth coil 60h are in such a state as to be connected in series. That is to say, two coils from among the first to eighth coils 60a to 60h, that is, eight coils, are connected through the anode side commutating brush 52 and the cathode side commutating brush 53, and no current flows through these two coils, and thus, the remaining six coils form a parallel circuit.

Figure 11:
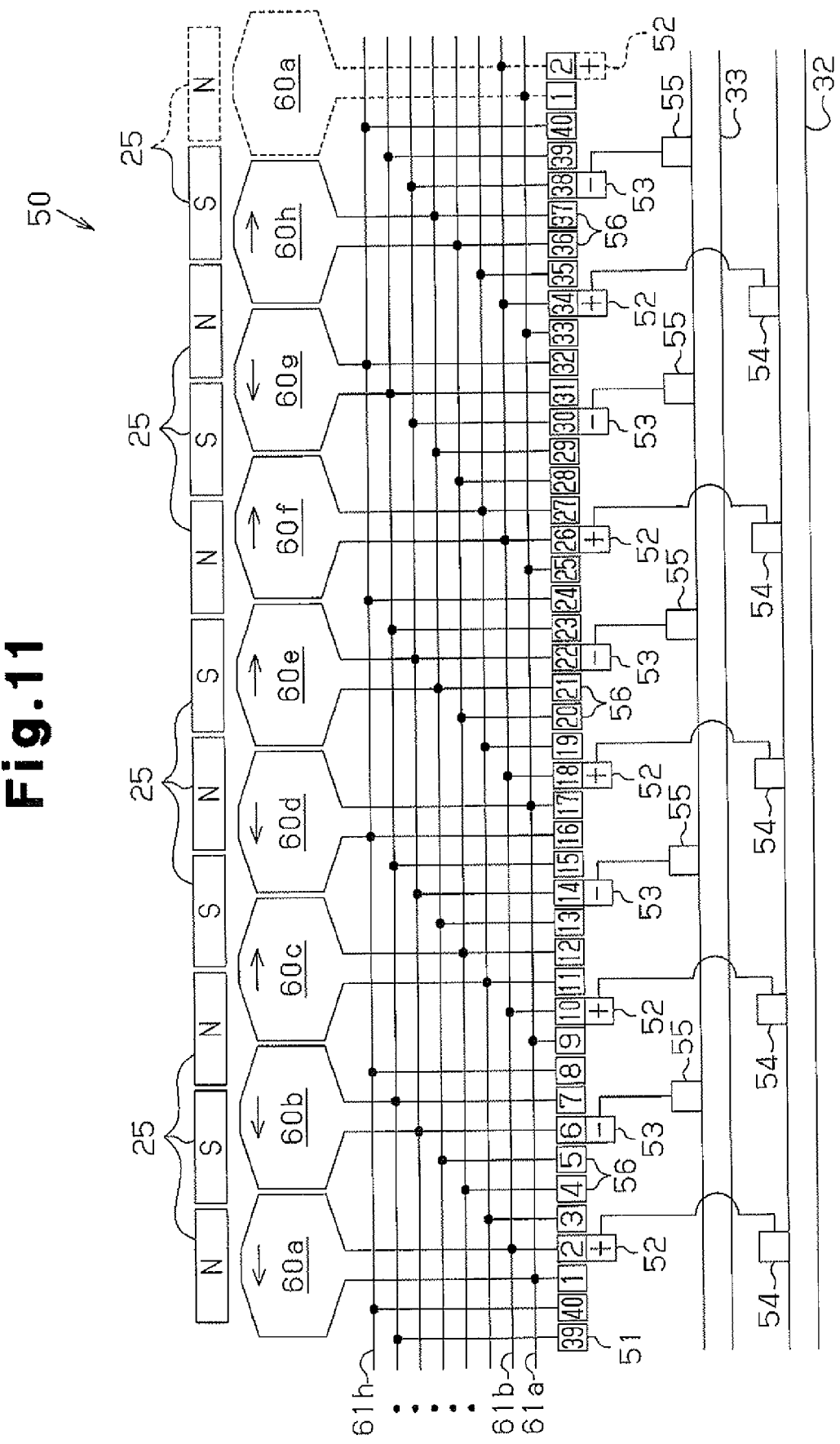
FIG. 11 is a development view of the motor of FIG. 10.

FIG. 11 shows a development of the motor 50 in a state where the rotor 20 has rotated by half the width of the segments 56 in the circumferential direction from the state shown in FIG. 10. At this time, neither the anode side commutating brush 52 nor the cathode side commutating brush 53 lies over adjacent segments 56. Accordingly, there are no coils through which no current flows. That is to say, a current flows through all of the first to eighth coils 60a to 60h, that is, eight coils, so that a magnetic flux is generated. In addition, between the anode side commutating brush 52 and the cathode side commutating brush 53, the first coil 60a, the fourth coil 60d, the seventh coil 60g and the second coil 60b are in such a state as to be connected in series, and the sixth coil 60f, the third coil 60c, the eighth coil 60h and the fifth coil 60e are in such a state as to be connected in series.

That is to say, when a current is supplied to the motor 50 and the rotor 20 rotates, the anode side commutating brush 52 and the cathode side commutating brush 53 move along one closed loop formed of the first to eighth coils 60a to 60h, that is, eight coils. In FIG. 12, the anode side commutating brush 52 and the cathode side commutating brush 53 rotate in the counterclockwise direction along the closed loop formed of the first to eighth coils 60a to 60h. In addition, five segments 56 at intervals of 72°, which found in 360°/(number of field poles 2P/2), are connected to each other through the first to eighth short-circuit members 61a to 61h. The angle between the anode side commutating brush 52 and the cathode side commutating brush 53 is an angle which is gained by multiplying 360°/number of field poles 2P by an odd number. Therefore, such a state that no current flows through two of the first to eighth coils 60a to 60h, that is, eight coils, and a current flows through the remaining six coils, so that a magnetic flux is generated, and such a state that a current is supplied to all of the first to eighth coils 60a to 60h, that is, eight coils, so that a magnetic flux is generated are alternately repeated. The direction of the current that is supplied to the respective first to eighth coils 60a to 60h, is switched in sequence.

As described above, the present embodiment has the following additional advantages.

(21) The first to eighth coils 60a to 60h, that is, eight coils, which are provided in the armature stator 10, are respectively connected to a number of segments 56 which form the commutator 51. The anode side commutating brush 52 and the cathode side commutating brush 53 which make contact with and slide against the commutator 51 rotate together with the rotor 20, so that a current is supplied to and commutates the first to eighth coils 60a to 60h. Accordingly, it becomes possible for the armature stator 10 having the first to eighth coils 60a to 60h to commutate a current for each of the first to eighth coils 60a to 60h without using a control circuit in the motor 50 having a configuration where the armature stator 10 having the first to eighth coils 60a to 60h is arranged outside the rotor 20 in the radial direction. In addition, the configuration can be made so that only two coils from among the first to eighth coils 60a to 60h do not generate a magnetic flux: one coil which is connected through the anode side commutating brush 52 and one coil which is connected through the cathode side commutating brush 53. As a result, the efficiency of use of the first to eighth coils 60a to 60h can be increased in comparison with conventional motors.

(22) Five segments 56 at intervals of 72°, which is found in 360°/(number of field poles 2P/2), are connected to any of the first to eighth coils 60a to 60h, that is eight coils, through the first to eighth short-circuit members 61a to 61h. The first to eighth coils 60a to 60h, that is, eight coils, are connected in series so as to form one closed loop. The angle between the anode side commutating brush 52 and the cathode side commutating brush 53 is an angle which is gained by multiplying 360°/number of field poles 2P by an odd number (36°, which is gained by multiplying 36° by one, in the present embodiment). When the rotor 20 rotates in this motor 50, the anode side commutating brush 52 and the cathode side commutating brush 53 make contact with and slide against the commutator 51, and thus, move along one closed loop which is formed of the first to eighth coils 60a to 60h, that is, eight coils. Then, a current flows through coils other than those to which the anode side commutating brush 52 and the cathode side commutating brush 53 are connected so that a current is commutated, and thus, a magnetic flux is generated. That is to say, the maximum number of coils to which no current is supplied from among the first to eighth coils 60*a* to 60*h*, that is, eight coils, is two, and therefore, the efficiency of use of the first to eighth coils 60*a* to 60*h* can be increased without fail, in comparison with conventional motors. When the motor 50 is driven, a parallel circuit is formed of the first to eighth coils 60*a* to 60*h* between the anode side commutating brush 52 and the cathode side commutating brush 53, and therefore, a current can be appropriately commutated with a small voltage applied to the individual first to eighth coils 60*a* to 60*h*.

(23) In the present embodiment, where the number of field poles 2P is ten, the number of coils Q is set at eight, so that it is different from the number of field poles within such a range that it is greater than number of field poles 2P×¾ and smaller than number of field poles×³⁄₂. Setting is carried out in this manner, and thus, the motor 50 having a short pitch factor (0.924) which is greater than the short pitch factor of conventional motors (0.866), where the number of field poles 2P is two and the number of coils Q is three, can be provided. Accordingly, the motor 50 can gain an output which is greater than that of conventional motors. In addition, as can be seen from FIG. 8, when the number of coils Q is set in this manner, the commutated voltage is smaller than that of conventional motors.

(24) The first to eighth coils 60*a* to 60*h* are wound around the teeth 11*b* of the stator core 11 in the form of concentrated winding, and therefore, the first to eighth coil 60*a* to 60*h* can respectively generate magnetic poles; either N poles or S poles, clearly.

(25) Five segments 56 at intervals of 72° from among the segments 56 are connected to each other through the first to eighth short-circuit members 61*a* to 61*h* so as to have the same potential, and furthermore, five anode side commutating brushes 52 and five cathode side commutating brushes 53 make contact with and slide against the commutator 51. Accordingly, inconsistency in the supply of a current to the first to eighth coils 60*a* to 60*h* can be reduced and sparks can be prevented from being created, and thus, the damage to the commutator 51, the anode side commutating brushes 52 and the cathode side commutating brushes 53 can be reduced.

The embodiments of the present invention may be modified in the following manner.

Though in the above described embodiments, two permanent magnets 25 form one field pole, the invention is not limited to this, and one field pole may be formed of one permanent magnet 25. In this configuration, the number of parts can be reduced, so that the cost of manufacture can be reduced. In addition, assembly can be made easier.

Though in the above described embodiments, the motors 1 and 50 are an interior permanent magnet motor (IPM motor), where permanent magnets 25 are embedded in the rotor core, the invention is not limited to this, and may provide motors which are not interior magnet permanent motors.

The above described embodiments provide a number of anode side commutating brushes 36 and 52, as well as a number of cathode side commutating brushes 37 and 53. However, the first to ninth coils 12*a* to 12*i* and the first to eighth coils 60*a* to 60*h* are connected to each other through the first to ninth short-circuit members 18*a* to 18*i* and the first to eighth short-circuit members 61*a* to 61*h*, and therefore, the number of anode side commutating brushes 36 and 52, as well as the number of cathode side commutating brushes 37 and 53, may respectively be reduced to one. At this time, the anode side commutating brush 36 or 52 and the cathode side commutating brush 37 or 53 are arranged in such a manner that an angle which is gained by multiplying 360°/number of field poles 2P by an odd number is provided between the anode side commutating brush 36 or 52 and the cathode side commutating brush 37 or 53. In this configuration, the motor 1 or 50 can further be miniaturized.

In the motor 1 of the above described first embodiment, the number of field poles 2P is set at eight and the number of coils Q is set at nine. In addition, in the motor 50 of the above described second embodiment, the number of field poles 2P is set at ten and the number of coils Q is set at eight. However, the invention is not limited to this, and the number of coils Q may be set at any value which is different from the number of field poles within such a range that it is greater than the number of field poles 2P×¾ and smaller than the number of field poles×³⁄₂. In this configuration, a motor having a short pitch factor which is greater than the short pitch factor of conventional motors, in which the number of field poles 2P is two and the number of coils Q is three, can be gained (a motor for which the data is as that surrounded by the thick frames in FIG. 8 can be gained). As a result, the motor having a greater output than the conventional motors can be gained.

Though in the above described embodiments, permanent magnets 25 of which the maximum energy product is no less than 100 kJ/m³ are used, the invention is not limited to this, and permanent magnets of which the maximum energy product is smaller than 100 kJ/m³ may be used. In this case, as shown in FIG. 9, the greater the number of field poles 2P is, the greater the output density of the motor becomes.

Though in the motor 1 of the above described first embodiment, the number of field poles 2P and the number of coils Q are set at (2P, Q)=(8, 9), the invention is not limited to this. They may be set at, for example, any of (2P, Q)=(2, 3), (4, 5) or (6, 8). In addition, it can be seen from the curves shown as solid lines in the graph of FIG. 9 that the output density of motors of which the number of field poles 2P is no less than four increases as the maximum energy product of the permanent magnets increases. Accordingly, the combinations of the number of field poles 2P and the number of coils Q are not limited to three: (2P, Q)=(2, 3), (4, 5) and (6, 8), and other combinations may be set, as long as the number of field poles 2P is no less than four. In this configuration, a motor which provides a higher output density can be gained by increasing the maximum energy product of the permanent magnets.

Though in the above described embodiments, the commutator 17 is secured to the armature stator 10 via the second housing member 3*b*, it may be secured directly to the armature stator 10.

The motors in the above described embodiments are of an inner rotor type. That is to say, an armature stator 10 having a number of coils is arranged outside the rotor 20 having a number of field poles formed of permanent magnets 25 in the radial direction, and this configuration allows the rotor 20 which is arranged inside the armature stator 10 in the radial direction to rotate when a current is supplied to the motor 1 or 50. However, the motor may be of an outer rotor type. Concretely, a stator may be arranged in the center portion as a field body having field poles formed of permanent magnets 25, and a rotor may be arranged outside this stator in the radial direction as an armature body having a number of coils in the configuration. In this case, the commutator 17 or 51 rotates together with the armature body, which is a rotor.

The invention claimed is:

1. A motor, comprising:
a field body having a plurality of field poles;
an armature body having a plurality of coils which is placed outside the field body in a radial direction;

a commutator which is secured to the armature body, the commutator having a plurality of segments to which the coils are respectively connected, where the commutator is in annular form and the segments are aligned in a circumferential direction;

a power supplying part for supplying a current to the coils, the power supplying part being in annular form; and a brush holder containing an anode side brush device which makes contact with and slides against the commutator and the power supplying part, and a cathode side brush device which makes contact with and slides against the commutator and the power supplying part, the brush holder being secured to the field body, wherein the brush devices are arranged between the commutator and the power supplying part, wherein the anode side brush device comprises: an anode side commutating brush which makes contact with and slides against the commutator; an anode side power supplying brush which makes contact with and slides against the power supplying part; and a first urging part for urging the anode side commutating brush and the anode side power supplying brush in opposite directions, and wherein the cathode side brush device comprises: a cathode side commutating brush which makes contact with and slides against the commutator; a cathode side power supplying brush which makes contact with and slides against the power supplying part; and a second urging part for urging the cathode side commutating brush and the cathode side power supplying brush in opposite directions.

2. A motor, comprising:

a rotor having a plurality of field poles;

an armature stator having a plurality of coils which is provided outside the rotor in a radial direction;

a commutator having a plurality of segments to which the coils are respectively connected, wherein the commutator is in annular form and the segments are aligned in a circumferential direction;

a power supplying part for supplying a current to the coils, the power supplying part being in annular form; and a brush holder containing an anode side brush device which makes contact with and slides against the commutator and the power supplying part, and a cathode side brush device which makes contact with and slides against the commutator and the power supplying part, the brush holder being rotatable together with the rotor, wherein the brush devices are arranged between the commutator and the power supplying part, wherein the anode side brush device comprises: an anode side commutating brush which makes contact with and slides against the commutator; an anode side power supplying brush which makes contact with and slides against the power supplying part; and a first urging part for urging the anode side commutating brush and the anode side power supplying brush in opposite directions, and wherein the cathode side brush device, comprises: a cathode side commutating brush which makes contact with and slides against the commutator; a cathode side power supplying brush which makes contact with and slides against the power supplying part; and a second urging part for urging the cathode side commutating brush and the cathode side power supplying brush in opposite directions.

3. A motor, comprising:

a rotor having field poles, the number of which is represented by 2P (P is a natural number);

an armature stator having coils, the number of which is represented by Q (Q is a natural number), the coils being placed outside the rotor in the radial direction;

a commutator having segments, the number of which is represented by P×Q, the coils being respectively connected to the segments, wherein the commutator is in annular form and the segments are aligned in a circumferential direction;

a power supplying part for supplying current to the coils, the power supplying part being in annular form; and a brush holder containing an anode side brush device which makes contact with and slides against the commutator and the power supplying part, and a cathode side brush device which makes contact with and slides against the commutator and the power supplying part, the brush holder being rotatable together with the rotor, wherein the brush devices are arranged between the commutator and the power supplying part, wherein the anode side brush device comprises: an anode side commutating brush which makes contact with and slides against the commutator; an anode side power supplying brush which makes contact with and slides against the power supplying part; and a first urging part for urging the anode side commutating brush and the anode side power supplying brush in opposite directions, and wherein the cathode side brush device comprises: a cathode side commutating brush which makes contact with and slides against the commutator; a cathode side power supplying brush which makes contact with and slides against the power supplying part; and a second urging part for urging the cathode side commutating brush and the cathode side power supplying brush in opposite directions.

4. The motor according to claim 1, wherein the segments are placed at equal angular intervals around the axial line of the commutator, wherein segments having angular intervals of 360°/(number of field poles/2) are short-circuited to each other through a short-circuited member, wherein all of the coils are connected in series so as to form one closed loop;

wherein the anode side brush device has an anode side commutating brush which makes contact with and slides against the commutator, wherein the cathode side brush device has a cathode side commutating brush which makes contact with and slides against the commutator, and wherein the anode side commutating brush and cathode side commutating brush are placed at an angular interval which is an odd number multiple of 360°/number of field poles.

5. The motor according to claim 1, wherein
the number of the field poles is no less than four.

6. The motor according to claim 1, wherein
the maximum energy product of the field poles is no less than 100 kJ/m$^3$.

7. The motor according to claim 1, wherein
the number of the coils is different from the number of the field poles, greater than the number of field poles×¾, and smaller than the number of field poles×3⁄2.

8. The motor according to claim 2, wherein
the armature stator has a stator core having a plurality of teeth, wherein the coils are wound around the teeth in the form of concentrated winding.

9. The motor according to claim 2, wherein
the rotor has a rotor core in which the field poles are embedded.

10. The motor according to claim 1, wherein
the combination of the number of the field poles and the number of the coils is set to any one of four combinations: (number of field poles, number of coils)=(2, 3), (4, 5), (6, 8), (8, 9), and the maximum energy product of the field poles is no less than 100 kJ/m$^3$.

11. The motor according to claim 2, wherein
the armature stator has a plurality of teeth extending in the radial direction and around which a plurality of coils are respectively wound,
wherein the commutator is secured to the armature body in such a manner as to face the teeth.

12. The motor according to claim 1, wherein
the brush devices are respectively placed between the commutator and the power supplying part with respect to an axial direction of the motor,
wherein the power supplying part has an anode side slip ring and a cathode side slip ring, and
wherein the brush holder rotates relative to the coils, and thus, the anode side power supplying brush makes contact with and slides against the anode side slip ring, the cathode side power supplying brush makes contact with and slides against the cathode side slip ring, and the anode side commutating brush and the cathode side commutating brush make contact with and slide against the segments, and as a result, a current which flows through the coils is switched.

* * * * *